US 6,513,754 B1

(12) United States Patent
Grove

(10) Patent No.: US 6,513,754 B1
(45) Date of Patent: Feb. 4, 2003

(54) TRANSONIC FLOW SHOCKWAVE POSITION STABILIZER

(75) Inventor: Darren V. Grove, Hollywood, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/963,887

(22) Filed: Sep. 26, 2001

(51) Int. Cl.[7] ................................................ B64C 3/28
(52) U.S. Cl. ..................... 244/35 A; 244/214; 244/130; 244/45 R
(58) Field of Search ............................. 244/45 R, 45 A, 244/1 N, 15, 218, 214, 213, 130, 123, 35 R, 35 A

(56) References Cited

U.S. PATENT DOCUMENTS

| | | | |
|---|---|---|---|
| 4,050,651 A | * 9/1977 | Neal et al. ..................... 244/15 |
| 4,311,289 A | * 1/1982 | Finch ........................ 244/35 R |
| 4,643,376 A | * 2/1987 | Vanderhoeven ............. 244/130 |
| 5,542,630 A | 8/1996 | Savill et al. |
| 5,692,709 A | 12/1997 | Mihora et al. |
| 5,797,414 A | 8/1998 | Sirovich et al. |
| 5,927,656 A | 7/1999 | Hinkleman |
| 5,984,229 A | 11/1999 | Hollowell et al. |
| 5,984,231 A | 11/1999 | Gerhardt et al. |
| 6,089,502 A | 7/2000 | Herrick et al. |
| 6,126,118 A | 10/2000 | Fujino et al. |

OTHER PUBLICATIONS

F18–E 2000.*

* cited by examiner

Primary Examiner—Galen L. Barefoot
(74) Attorney, Agent, or Firm—John D. Lewis

(57) ABSTRACT

A stabilizer suitable for stabilizing a shock formed during transonic velocity is presented. The stabilizer comprises an inboard end, an outboard end that forms an airfoil, which is positioned opposite the inboard end and, an upper surface that extends between the inboard end and the outboard end. A lower surface also extends between the inboard end and the outboard end and is positioned to oppose the upper surface. A leading edge between the upper surface and lower surface forms the stabilizer nose. A trailing edge positioned opposite the leading edge forms a generally concave surface. The outboard end of the stabilizer forms a predetermined angle omega with the trailing edge for positioning the outboard end relative to the trailing edge. The outboard end of the stabilizer forms a predetermined angle tau with the leading edge for providing a forward sweep angle. When attached to a leading edge of a reaction body such as a leading edge flap or wing, the stabilizer will modify the behavior of a transonic shock. When the magnitude of the leading edge sweep angle is equal to the sweep back angle of the opposite wing, radar signature is minimized. In some applications the modification to the behavior of the transonic shock prevents abrupt wing stall phenomena and optimally minimizes radar detection signature. A vehicle such as an airplane, rocket or water borne ship may incorporate the stabilizer on any of its reaction surfaces including control surfaces and furthermore in any particular location to modify the behavior of the shock.

20 Claims, 9 Drawing Sheets

TRANSONIC FLOW SHOCKWAVE POSITION STABILIZER

BACKGROUND

The present embodiment of the invention relates generally to transonic structures and more particularly to a device for preventing abrupt loss of lift where a boundary layer tends to interact with shocks during transonic flow conditions.

Predictable flight performance characteristics are of paramount importance in aircraft design. In flight, if lift suddenly decreases on one wing relative to the other, then a loss of control results and corrective action by the pilot is required. At low altitudes, if the wing abruptly losses lift, and corrective action cannot be quickly implemented, then a loss in aircraft and pilot may result. In military aircraft, predictable flight performance characteristics are necessary to precision maneuvers such as formation flying, and combat. In particular, military aircraft performance requires predictable flight performance characteristics during high-speed flight.

During high-speed transonic performance testing of an aircraft, many maneuvers are flown to test the capability of the aircraft. During such maneuvers a phenomenon known as Abrupt Wing Stall may occur. An abrupt asymmetric wing stall of the aircraft wing causes wing-drop. The abrupt loss of lift on a wing causes the aircraft to lose lateral control and the aircraft to roll uncontrollably about its longitudinal flight axis. Total loss of lift on both wings results in an aircraft stall that is manifested by the aircraft rotating forward and falling. In addition, flight control surfaces such as ailerons and flaps, which are located in the regions of flow separation, lose effectiveness.

For the past half century, abrupt wing stall phenomenon has been known to occur in many military combat aircraft such as the F/A-18E/F. The F/A-18E/F is a military aircraft that embodies enhancements to the original F/A-18 fighter-attack aircraft. The wing of the F/A-18E has a non-constant chord leading edge flap design. The wing includes an outboard leading edge flap having a snag to be described hereinbelow. During development of the Navy's F/A-18E, a complex shock-boundary layer interaction developed during transonic flight. A localized leading edge flap separation occurred just inboard of the snag and interacted with a preexisting shock on the upper wing surface, thereby causing wing-drop. Wing-drop was most likely to occur when the airplane angle of attack was increased as typically occurred during in-flight maneuvers at transonic velocities.

As is well known in the art, flow separation tends to occur at projections or structures located on the wing such as at a joint between a main wing and an engine nacelle. Such a phenomenon is referred to as flow interference. Use of fillets between the wing and the nacelle has been successful to prevent flow separation. However, fillets result in increased frontal area of the nacelle and wing combination thereby increasing form drag especially at higher speeds, in particular in and above the transonic range. "Form drag" is friction caused by the flow of air molecules past the skin of the airplane including all of the aircraft structures in contact with the airstream. Form drag produces a force that opposes the velocity of the airplane, thereby requiring more thrust from the engines. The application of these fillets is not generally suitable for stabilizing recovery shocks.

Vortex generators mounted on the upper surface of a wing have also been used successfully to prevent flow separation. Although vortex generators can be easily installed on existing structures, vortex generators are comparatively ineffective and incapable of preventing flow separation in regions of very violent flow as would be experienced in a highly maneuverable fighter aircraft especially aircraft operating at transonic speeds. Furthermore, the application of vortex generators is not generally applicable to stabilizing flow recovery shocks.

The use of a porous surface positioned at the upper surface of the wing has been used successfully to fix the position of the recovery shock. By fixing the shock, the region of shock induced flow separation remains fixed on the wing thereby preventing movement of the recovery shock from affecting lift patterns on the wing. However, porous surfaces have a detectable radar signature, which is not desirable in military aircraft. In addition, porous surfaces cause the recovery shock to be fixed forward at lower speeds resulting in lower coefficient of lift ($C_L$). In addition, porous surfaces cause earlier flow separation, which leads to early buffet onset, dramatically fatiguing the pilot and aircraft. Furthermore, the buffeting tends to induce vibration on the wings and structure of the aircraft leading to premature structural failure. As is well known in the art, Lift is related to the lift coefficient $C_L$ by the relationship $L=\frac{1}{2}\rho v^2 C_L$, where $C_L$ is generally linearly proportional to angle of attack $\alpha$. "$\alpha$" is the angle between the free stream velocity vector $V_\infty$ and the wing chord or other relevant point of reference on the aircraft. The "wing chord" is defined to be a straight line drawn from the leading edge of the wing to the centroid of the trailing edge of the wing. Therefore, when porous surfaces are used, higher angles of attack $\alpha$ are required to fly the airplane in order to compensate for the reduced $C_L$ resulting in reduced visibility and increased aerodynamic drag. Aerodynamic drag is also proportional to the angle of attack $\alpha$. Drag is related to the drag coefficient $C_D$ by the relationship $D=\frac{1}{2}\rho v^2 C_D$, where $C_D$ is generally linearly proportional to angle of attack $\alpha$.

Accordingly, there is a need to reduce or eliminate abrupt wing stall phenomenon.

There is a further need to have a minimum radar detection signature.

There is additionally a need to minimize vibration due to fluid dynamic conditions.

There is yet another need to minimize the reduction in Lift and the increase in Drag.

SUMMARY

The present invention is directed to a device that satisfies these needs. A stabilizer having features of the present invention comprises an inboard end, and an outboard end that forms a local airfoil. The outboard end is positioned opposite the inboard end. An upper surface extends between the inboard end and the outboard end. A lower surface also extends between the inboard end and the outboard end, and is positioned to oppose the upper surface. A leading edge between the upper surface and lower surface forms the stabilizer nose. A trailing edge forms a generally concave surface and is positioned opposite the leading edge. The outboard end of the stabilizer forms a predetermined angle omega with the trailing edge for positioning the outboard end relative to the trailing edge. The outboard end of the stabilizer forms a predetermined angle tau with the leading edge for providing forward sweep angle.

A vehicle having the features of the present invention has a main body and at least one reaction body. The reaction body comprises a reaction body leading edge and, a snag extending from the reaction body leading edge. The reaction body is attached to the main body to produce a reaction force. At least one stabilizer for stabilizing a shock formed at transonic speeds has an inboard end and an outboard end. The outboard end forms a local airfoil and is positioned opposite the inboard end. The stabilizer has an upper surface extending between the inboard end and the outboard end, a lower surface extending between the inboard end and the outboard end and, the lower surface opposing the upper surface. A stabilizer leading edge forms a stabilizer nose disposed between the upper surface and the lower surface. A trailing edge opposes the leading edge. The outboard end of the stabilizer forms a predetermined angle omega with the trailing edge of the stabilizer for positioning the outboard end of the stabilizer. The outboard end of the stabilizer forms a predetermined angle tau with the leading edge for providing forward sweep angle. The trailing edge of each stabilizer is attached to the reaction body leading edge inboard of the snag.

The vehicle encompasses any vehicle that travels through a fluid such as air, water, plasma or other fluid. The stabilizer may be positioned upon any reaction surface including a wing, fin, sailplane, leading edge flap, rudder, plane or other control surface. Where the main body has characteristics of a reaction body then the stabilizer may be attached to the main body. Installation of the stabilizer upon military aircraft is within the contemplation of the invention. When installed upon the leading edge of a reaction body, one embodiment of the stabilizer contemplates a forward sweep angle equal in magnitude to the sweep back angle of the opposing wing in order to minimize radar signature.

Accordingly, it is an advantage of the present invention that abrupt wing stall phenomenon is reduced or eliminated. It is a further advantage that radar detection signature is minimized. It is yet another advantage that vibration due to fluid dynamic conditions is minimized. There is yet another advantage in that the reduction in Lift and the increase in Drag are minimized.

BRIEF DESCRIPTION OF THE DRAWINGS

Referring now to the drawings in which like reference numbers represent corresponding parts throughout.

DESCRIPTION

In the following detailed description of the preferred embodiment, reference is made to the accompanying drawings in which is shown by way of illustration a specific embodiment whereby the invention may be practiced. It is to be understood that other embodiments may be utilized and structural changes may be made without departing from the scope of the present invention. Furthermore, it is to be appreciated that transonic flow shock phenomena occurs in medium other than air such as within water, plasma and other gasses and it is within the contemplation of the invention to apply to specific embodiments of apparatus that travel through these other mediums.

Figure 1:
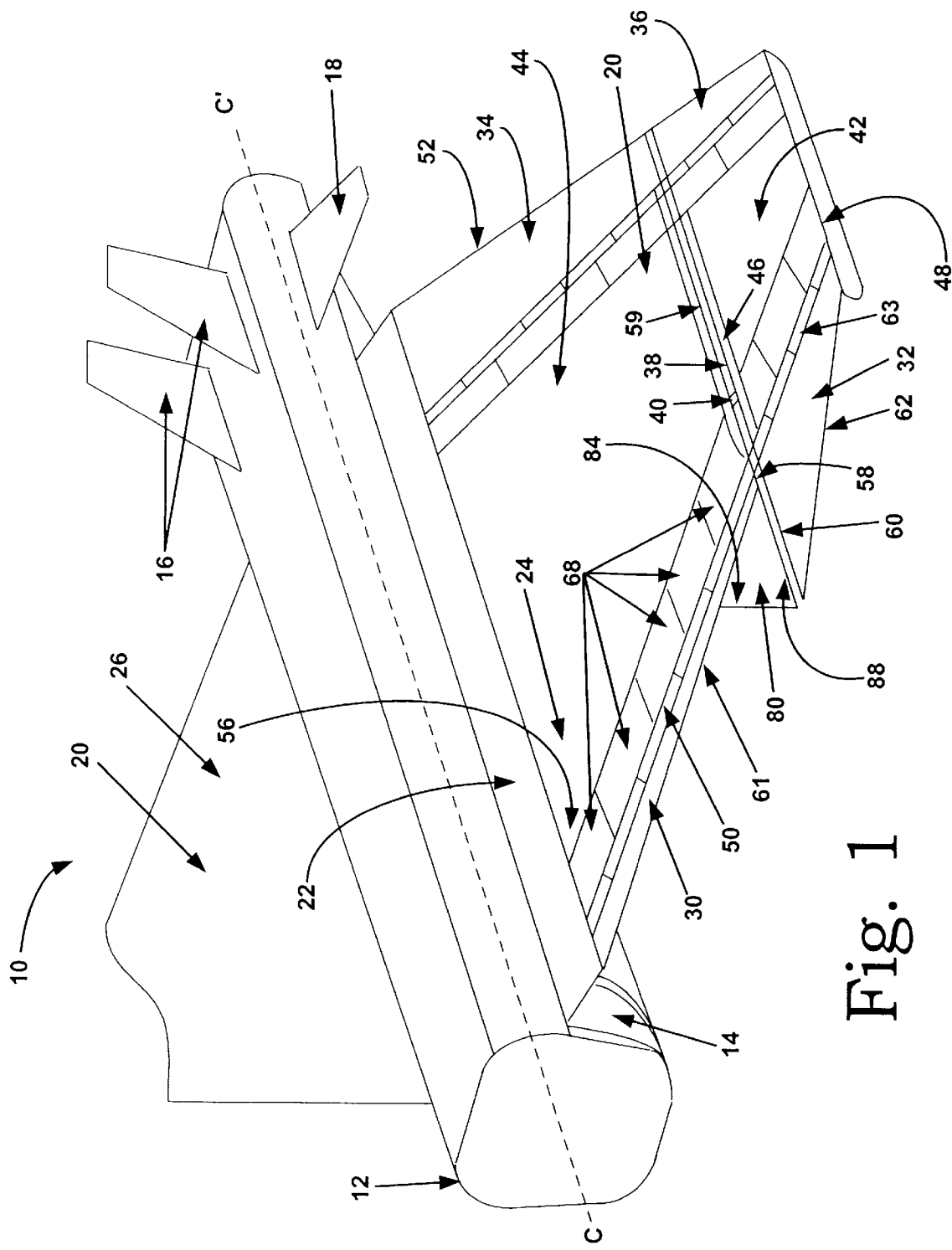
FIG. 1 shows a perspective view of a body, which incorporates an exemplary embodiment of the present invention.

Referring to FIG. 1, an example of a preferred embodiment of a transonic shock stabilizer is illustrated on an aircraft capable of flight through a fluid at transonic speeds. In the illustrated embodiment, a portion of an F/A-18E airplane is shown generally at 10. The airplane includes a fuselage 12 having a longitudinal axis C-C', engine air inlets 14 for admitting air, engines (not shown) for thrust, engine air outlets (not shown) for discharging the fuel-air mixture, rudders 16 for yaw control, and stabilators 18 for pitch control. Furthermore, the aircraft contains a pair of outwardly extending sweptback main wings 20.

It is to be appreciated that the term "aircraft" is a term used to describe a vehicle that travels through the air such as an airplane or rocket and that other vehicles traveling through fluid media such as ships through water are within the scope of the present invention. It is to be further appreciated that the term "fuselage" is a term used to describe the main body of an aircraft while the term "hull" would be used to describe the body of a ship that travels through water. Thus, the generic term "body" as used in the specification and claims refers to the main structure that travels through a fluid medium such as air, water or plasma. Furthermore, it is to be understood that the term "wing" can be understood to mean "reaction body." As used in this specification and claims a "reaction body" is an aerodynamic shape that is designed to produce a force such as lift when a fluid passes over the reaction body and includes without limitation a wing, aileron, flap, tail, rudder, elevator, stabilator, horizontal stabilizer, trim tab, propeller, sail plane, rudder, and the like. As is well known in the art, often a main body is also a reaction body.

The main wings 20 are formed in a conventional manner, such as including a center wing box 22, a left wing-box 24, and a right wing-box 26. Each wing box is similarly configured using front and rear spars. Upper and lower skin panels typically formed from metal alloys or composites cover the spars to form the wing surfaces.

Each main wing 20 includes an inner leading edge flap 30, an outer leading edge flap 32, a trailing edge flap 34 and an aileron 36. Fuel bladders, tanks and other equipment (not shown) are contained within the wing as is well known in the art. Although not shown in the illustrated embodiment, each wing can also include other lift and control surfaces such as slats and spoilers. A wingfold 38 is located at approximately the 180 in. buttline from the longitudinal axis C-C'. The boundary between the inner leading edge flap 30 and the outer leading edge flap 32 is positioned at the wingfold 38, as will be described hereinbelow. Hinges 40 are provided at the wingfold in order to fold the wing upwardly. The outer section 42 of the wing is folded up and locked into position in order to minimize the storage space required for the F/A-18E when stored upon an aircraft carrier. In the stored position, the outer-section of the wing is folded at the wingfold and the outboard section extends perpendicularly from the inner section 44 of the wing. A wingfold fairing 46 is positioned over the wingfold hinges 40 to protect the hinge-fold-mechanism. Auxiliary equipment and armament equipment (not shown) are provided at a wing tip 48 as is well known in the art. Such equipment typically includes navigation lights and missile launchers.

Each wing has a leading edge hinge line 50 with a leading-edge sweep angle $\lambda_{LE}$ and a trailing edge 52 with a trailing edge sweep angle $\lambda_{TE}$ of lesser or equal degree as the leading-edge sweep angle $\lambda_{LE}$. "Sweep angle" is defined from a line extending perpendicularly from the longitudinal axis C–C' of the fuselage. The leading edge flaps 30, 32 extend from the leading edge hinge line 50 and are attached to a leading edge flap drive linkage 72 (See FIG. 3). At the root 56 of the wing, the inner leading edge flap 30 has generally a 17% Local Chord Flap Ratio (LCFR). An outboard edge 58 of the inner leading edge flap is aligned with the inner edge 59 of the wing 20 at the wingfold. The outboard edge 58 has generally a 9% LCFR. "LCFR" is defined as the ratio of the flap chord to wing chord at the local airfoil cross-section. The foregoing LCFR's result in a backward sweep angle $\lambda'_{LE}$ of generally 29.4 degrees for a leading edge 61 of the inner leading edge flap. One skilled in the art will appreciate that other sweep angles could be formed dependant upon the desired flight characteristics of the aircraft.

An inboard side 60 of the outer leading edge flap 32 is spaced approximately 0.375 in. from the outboard edge 58 of the inner leading edge flap 30. The inboard side 60 of the outer leading edge flap forms an LCFR of about 18% at the 180.375 buttline. from the longitudinal axis C–C'. It is to be appreciated that the LCFR results in the inboard side of the outer leading edge flap extending forward with respect to the outboard edge of the inner leading edge flap. The outer leading edge flap defines a LCFR of about 9% at approximately the 250 in. buttline from the longitudinal axis C–C', thereby defining a sweep back angle $\lambda''_{LE}$ equal to 29.4 degrees The extension of the outer leading edge flap 32 with respect to the inner leading edge flap 30 is forms a snag. A snag is an extension of a portion of a reaction body with reference to the same or another reaction body, the snag extending forward in the general direction of flight. The purpose of the snag of the F/A-18E aircraft is to provide enhanced maneuverability, particularly during aircraft carrier landings or powered approach landings. By providing a leading edge outer flap with increased surface area, greater lift can be generated as the linkage 72 is rotated than would be available without the snag.

Figure 2:
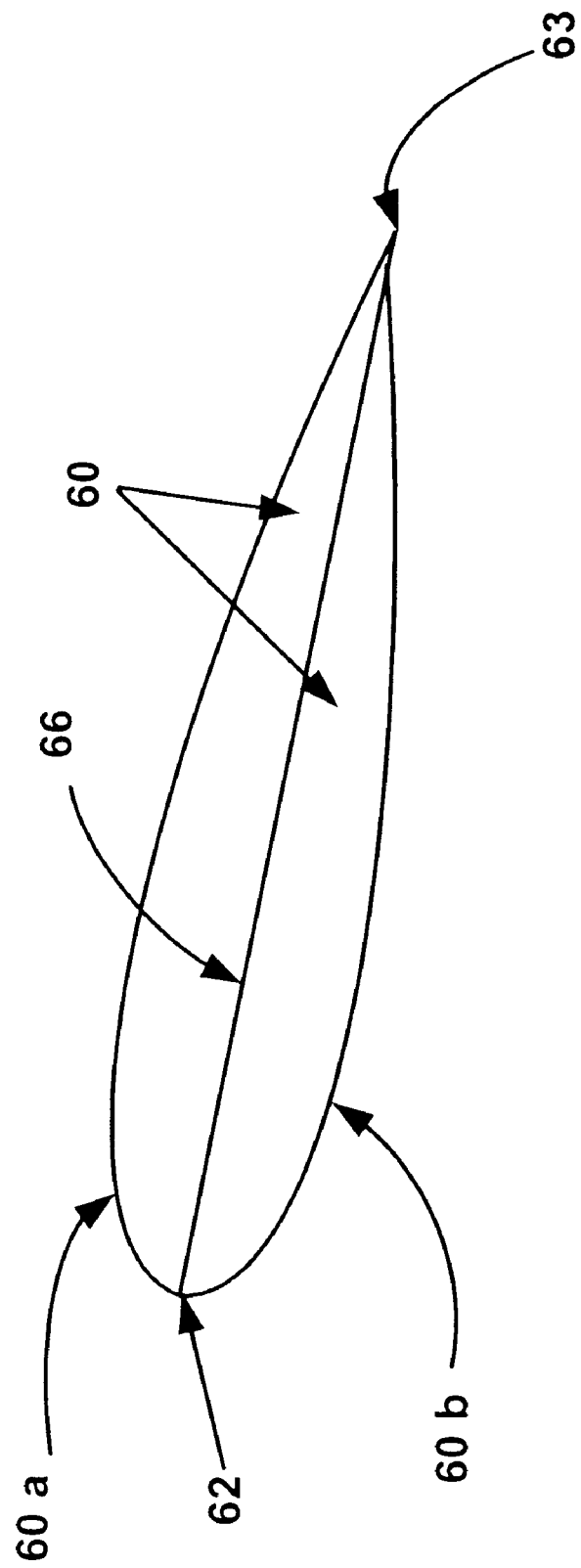
FIG. 2 shows an elevation view of the outer leading edge flap.

Referring to FIG. 2, the inboard side 60 of the outer leading edge flap 32 forms a chine 66. The chine is an edge that extends from the leading edge 62 of the outboard leading edge flap 32 to a trailing edge 63 of the outboard leading edge flap. The chine is positioned above a plane defined from the upper inboard edge 60a to the lower inboard edge 60b of the outer leading edge flap. The chine and edges 60a and 60b form an inclined surface therebetween. The purpose of the chine is to reduce radar signature.

Figure 3:
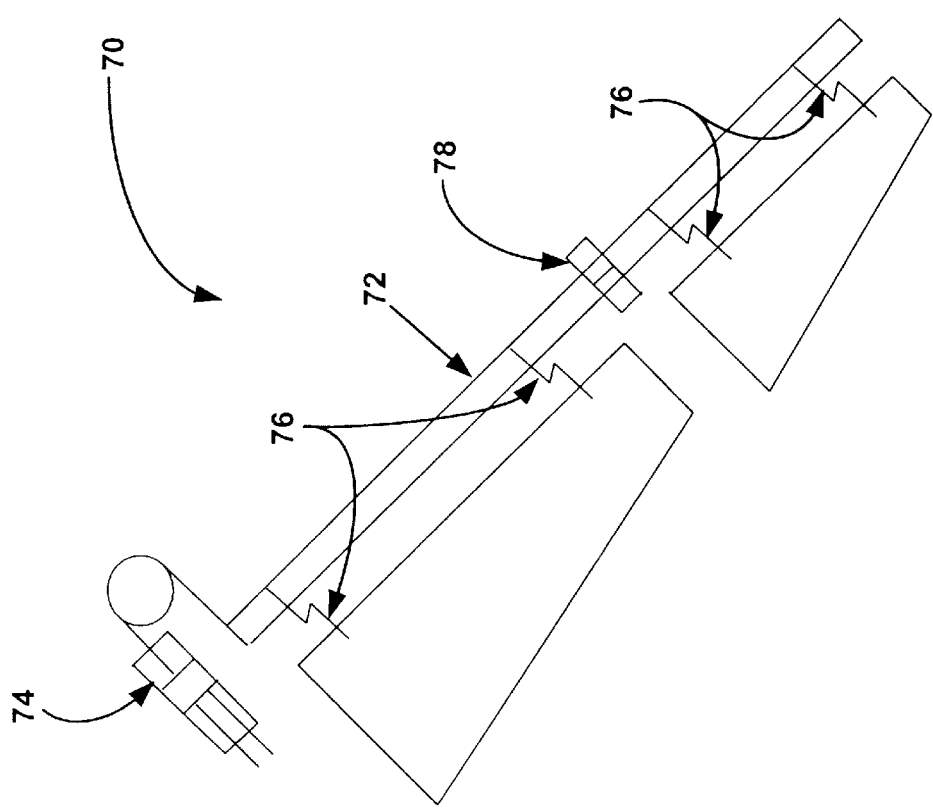
FIG. 3 shows a perspective view of the linkage for the leading edge flaps of an exemplary embodiment of the present invention.

Referring to FIG. 3, the drive linkage assembly is shown generally at 70. The linkage 72 is positioned at the leading edge hinge line 50 of the wing beneath a plurality of leading edge flap shrouds 68. (See FIG. 1.) The shrouds are rectangular plates positioned flush with the upper surface of the wing. The shrouds are used for keeping debris away from the linkage and other equipment located beneath the shrouds as well as to smoothly transition flow from the leading edge flap to the wing-box. The shrouds are pivotally attached to the wing and spring loaded to maintain them flush with the wing in order to minimize drag when the leading edge flaps 30 and 32 are retracted. The shrouds rotate about their respective pivots when the drive linkage 72 is rotated to extend the leading edge flaps 30,32. The linkage extends along the leading edge hinge line 50 from the root 56 and past the wingfold 38. The linkage is rotated by a hydraulic drive unit 74, which rotates the linkage upon a control signal from the control system (not illustrated). Each leading edge flap is pivotally connected to the linkage by a plurality of rods 76. A spline 78 is located on the linkage 72 between the inner leading edge flap and the outer leading edge flap, thereby providing biasing capability between the outboard leading edge flap angle of attack α from the inner leading edge flap angle of attack α. In the embodiment illustrated the biasing capability is not used.

Figure 4:
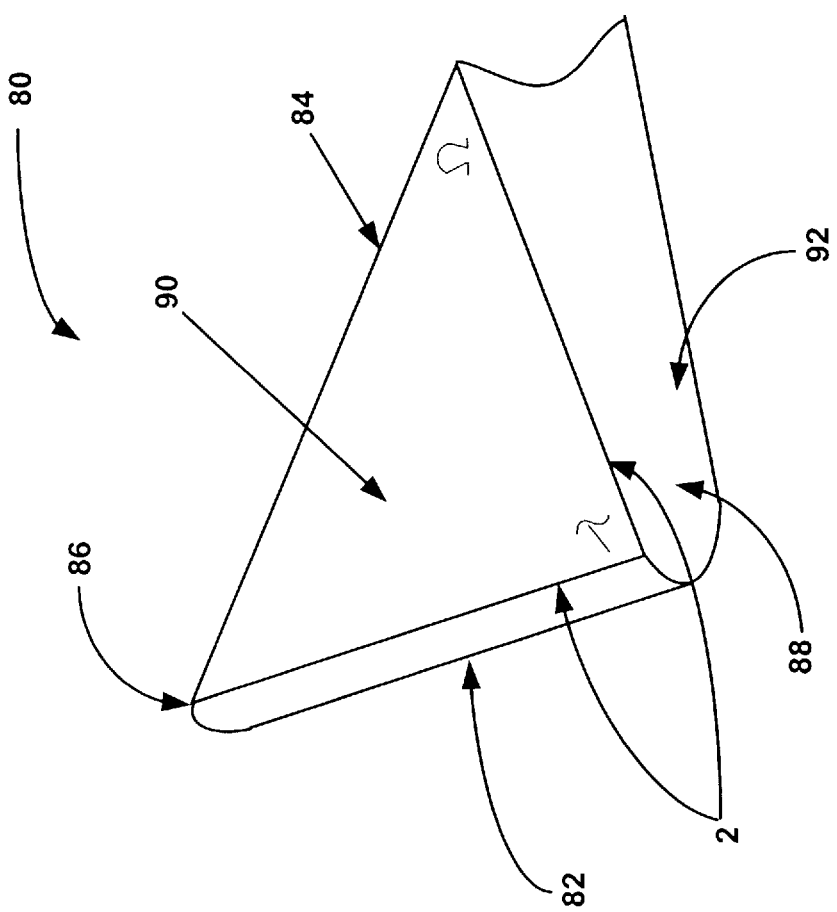
FIG. 4 shows a perspective view of the stabilizer of the present invention.
Figure 5:
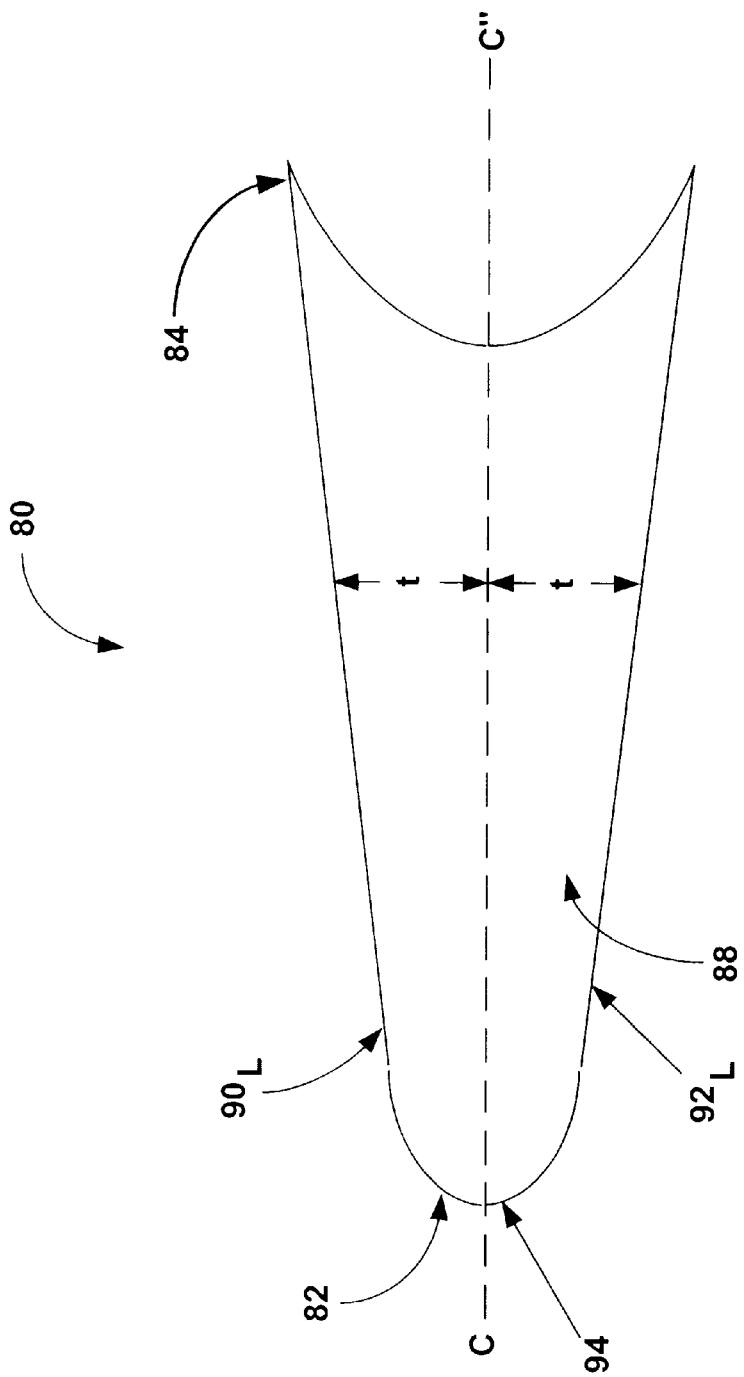
FIG. 5 shows an elevation view of the stabilizer of FIG. 4.
Figure 6:
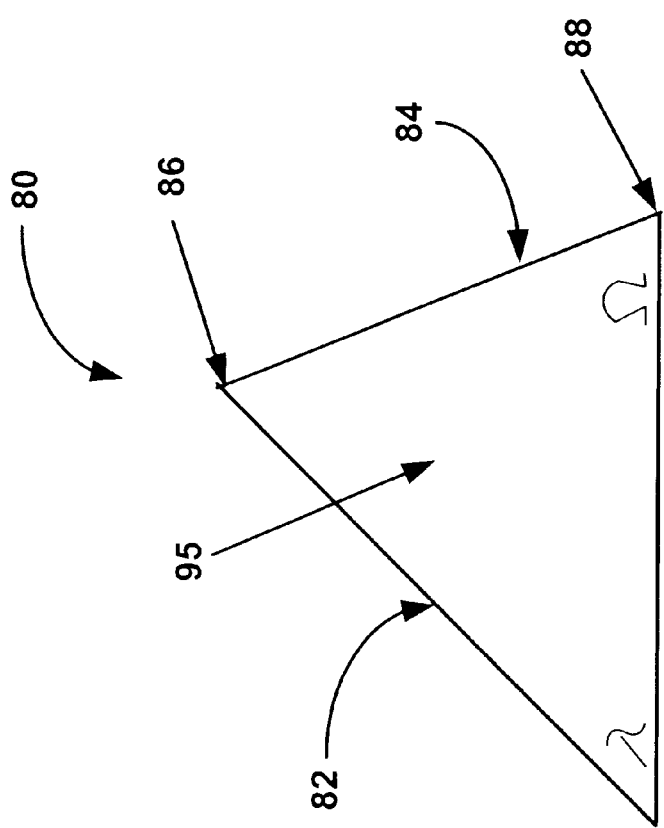
FIG. 6 shows a plan view of the stabilizer of FIG. 4.

Referring to FIGS. 4,5, and 6 a transonic flow shock stabilizer 80 is shown. The stabilizer is fashioned from a combination of local airfoils thereby defining a stabilizer leading edge 82 and a stabilizer trailing edge 84. As used in this specification and claims, an airfoil is a three dimensional shape designed to provide a desired reaction force when in motion relative to the surrounding air. As used in this specification and claims a local airfoil is a two-dimensional cross-section of an airfoil. The chord of each local airfoil of the stabilizer increases from an inboard end 86 to an outboard end 88 of the stabilizer. It is to be appreciated that the outboard end has the longest chord. The combination of airfoils defines a predetermined angle Tau τ such that when the stabilizer is installed on the inboard leading edge flap 30, the stabilizer forms a new forward sweep angle Chi ψ. "Tau τ" is defined as the angle between the leading edge 82 of the stabilizer 80 and the outboard end 88 of the stabilizer. In the preferred embodiment Chi ψ is a forward sweep angle that is equal in magnitude to the sweep back angle of the opposite leading edge flap, 29.4 degrees. It can be appreciated that the magnitude of Chi ψ is determined by the magnitude angle Tau τ and angle Omega Ω to be described hereinbelow.

An angle Omega Ω is located between the trailing edge 84 of the stabilizer and the outboard end 88 of the stabilizer 80. Omega Ω is a predetermined angle selected to align the trailing edge 84 of the stabilizer with the leading edge 61 of the inner leading edge flap 30. When aligned as shown in the illustrated embodiment, the stabilizer is positioned with the outboard end 88 of the stabilizer parallel to the plane defined from the upper inboard edge 60a to the lower inboard edge 60b of the outer leading edge flap 32. In the illustrated embodiment the outboard end 88 of the stabilizer is aligned with the outboard edge 58 of the inner leading edge flap 30 to form a continuous surface. It is to be appreciated by those skilled in the art that the values of Omega Ω and Tau τ are derived from the predetermined forward sweep angle Chi ψ.

It can be appreciated by one skilled in the art that the forward sweep angle Chi ψ may range between 0 and 90 degrees and is preferably equal in magnitude to the sweep back of the wing 20 on the opposite side of the fuselage 12. The resulting range of angle Omega may be between 0 degrees and 90 degrees. The resulting range of angle Tau τ is also between 0 degrees and 90 degrees.

Referring now to FIG. 5, each local airfoil of the stabilizer consists of an upper boundary $90_L$ and lower boundary $92_L$, each boundary being spaced from a stabilizer chord C–C" by a variable predetermined airfoil thickness "t" extending perpendicularly from either side of the stabilizer chord C–C". The value of "t" at the outboard end 88 results in an airfoil profile for the stabilizer forward of the inboard leading edge flap that generally matches the airfoil profile of the outer leading edge flap. It is to be appreciated that at each local airfoil of the stabilizer, the maximum value of t is reached at the trailing edge 84 of the stabilizer. The thickness t at the trailing edge 84 of the stabilizer is a predetermined size to match-up to the leading edge 61 of the inboard leading edge flap 30 between the stabilizer and the flap. The thickness t decreases along the chord of the stabilizer from the trailing edge 84 to the leading edge 82 of the stabilizer thereby blending into the leading edge 61 of the inner leading edge flap 30, to thereby extend the leading edge of the inner leading edge flap. The leading edge 82 of the stabilizer is curved to form a nose 94. The nose 94 provides a smooth transitional surface between the upper surface 90 and lower surface 92 of the stabilizer. The nose 94 of the stabilizer is selected to match the airfoil nose radius of the leading edge flap as is well known in the art. As shown in FIGS. 4 and 5 the stabilizer trailing edge 84 forms a concave surface that fits snugly over the leading edge of the inboard leading edge flap.

Referring again to FIG. 1, the transonic flow shock stabilizer 80 is shown installed on the leading edge 61 of the inboard leading edge flap 30. When mounted on the inboard leading edge flap, the trailing edge 84 of the stabilizer is affixed to the leading edge 61 of the inner leading edge flap: and, the outboard end 88 of the stabilizer is positioned at the outboard edge 58 of the inner leading edge flap 30 to form a continuous surface with the outboard edge 58. The outboard end 88 of the stabilizer is stepped away from the chine 66 (See FIG. 2) of the outer leading edge flap 32, approximately 0.375 in. as previously described. Furthermore, the local airfoil profile at the outboard end of the stabilizer and the inboard end of the outboard leading edge flap match-up along the snag.

The trailing edge 84 of the stabilizer 80 matches-up to and is aligned with the upper and lower surfaces of the inner leading edge flap 30 at the leading edge 61 of the inner flap to form continuous upper and lower surfaces. Each local airfoil of the stabilizer thereby extends the leading edge of the inboard leading edge flap, and the leading edge of the stabilizer thereby becomes the leading edge of the inboard leading edge flap along the boundary therebetween.

As shown in the preferred embodiment, the forward sweep angle Chi ψ preferably about 29.4 degrees. The magnitude of the forward sweep angle Chi ψ is preferably equal in magnitude to the backward sweep angle of the leading edge of the inner leading edge flap on the opposite main wing 20. Using a forward sweep angle equal to the sweep back of the opposite $\lambda_{LE}'$ minimizes radar signature, thereby making radar detection more difficult. Other forward sweep angles are within the scope of the invention, which provide more or less signature minimization as a trade-off to the desired aerodynamic characteristics.

It should be appreciated that other embodiments of the stabilizer 80 contemplate installation on a wing (not shown) that does not include leading edge flaps. For example, but without limitation, the benefits of the stabilizer may be obtained when installed on the leading edge of a wing where the wing comprises an outboard portion having a leading edge that extends forward of the leading edge of the inboard portion of the wing. One skilled in the art would appreciate that the stabilizer may also be used in any application when the boundary layer of a fluid is desired to be modified, for example, even for an aerodynamic shape that has an inboard snag or even a shape that does not specifically embody a snag.

The stabilizer may be added to a pre-existing reaction body or may be formed integrally or otherwise during construction of the reaction body as, for example, a wing. In either case, the structure of the reaction body should be modified as appropriate to accommodate the addition of the stabilizer. In the preferred embodiment shown, the stabilizer is riveted to the leading edge 61 of the inboard leading edge flap 30. However as is well known in the art other means of attachment are within the scope of the invention. Fasteners such as welds, bolts, screws or similar devices are positioned near the extended ends to attach the stabilizer to the reaction body. As is known in the art, epoxy or chemical bonding also can be utilized.

Preferably, the upper and lower surfaces of the stabilizer 80 form a continuous surface with the respective surfaces of the inboard leading edge flap 30 in order to reduce projections into the fluid flow that could initiate the formation of unwanted shocks and furthermore to produce stable aerodynamic characteristics.

The stabilizer is formed in a conventional manner having internal structural components such as trusses and spars (not shown) to maintain its overall shape and covered by a skin to form the upper and lower surfaces 90, 92. Such techniques are well known in the art. The stabilizer is preferably constructed from materials such as metals, for example aluminum alloy, or composites, for example titanium alloy and sintered plastic, or the like used in the construction of wings. Such materials and techniques are well known by those skilled in the art. The material and shape of the body to which the stabilizer is to be applied dictates the choice of material and is well known in the art.

The operation of the present embodiment of the invention will now be described. "Transonic airfoils" are those airfoils designed to operate at high subsonic free stream velocity (measured in terms of Mach which is denoted by "M") with significant regions of locally supersonic flow. Free stream velocity $V_\infty$. is the velocity of a fluid, typically air, which exists in the absence of influence from the body, relative to the body moving through the air. The subscript "∞" denotes conditions in the free stream. Mach number M is a dimensionless parameter, defined as the speed of interest in a medium divided by the speed of sound in that medium. An airplane traveling through the air, typically at or exceeding free stream velocity of approximately $M_\infty$. equal to 0.8 characterizes transonic flight. During transonic flight regions of local supersonic flow are produced in-and-around the wing.

The critical Mach number, $M_{crit.}$, is defined as the Mach number at which sonic flow is first obtained somewhere on the airfoil surface. A "bubble" of supersonic flow will occur surrounding the minimum static pressure point on the airfoil. If the freestream Mach number, $M_4$. is further increased a sudden and dramatic rise in drag coefficient $C_D$ will occur. The dramatic rise occurs at a Mach number defined as $M_{drag\ divergence}$. Here, shocks suddenly appear at the region of supersonic flow. The shocks themselves are dissipative and are needed to "shock down" the sonic flow to freestream conditions. The dissipative shock is called the recovery shock. The strong pressure increase across the recovery shock creates a strong adverse pressure gradient, thereby causing shock induced flow separation.

Flow patterns upstream of the shock are characterized by flow conditions, which produce lift on the wing. Flow patterns behind the recovery shock are characterized by reverse flow. Flow behind the recovery shock (within the region of flow reversal) results in a significant reduction in lift. Therefore, if the shock moves from the region of the trailing edge towards the leading edge, lift decreases as the region of flow reversal increases.

Figure 7:
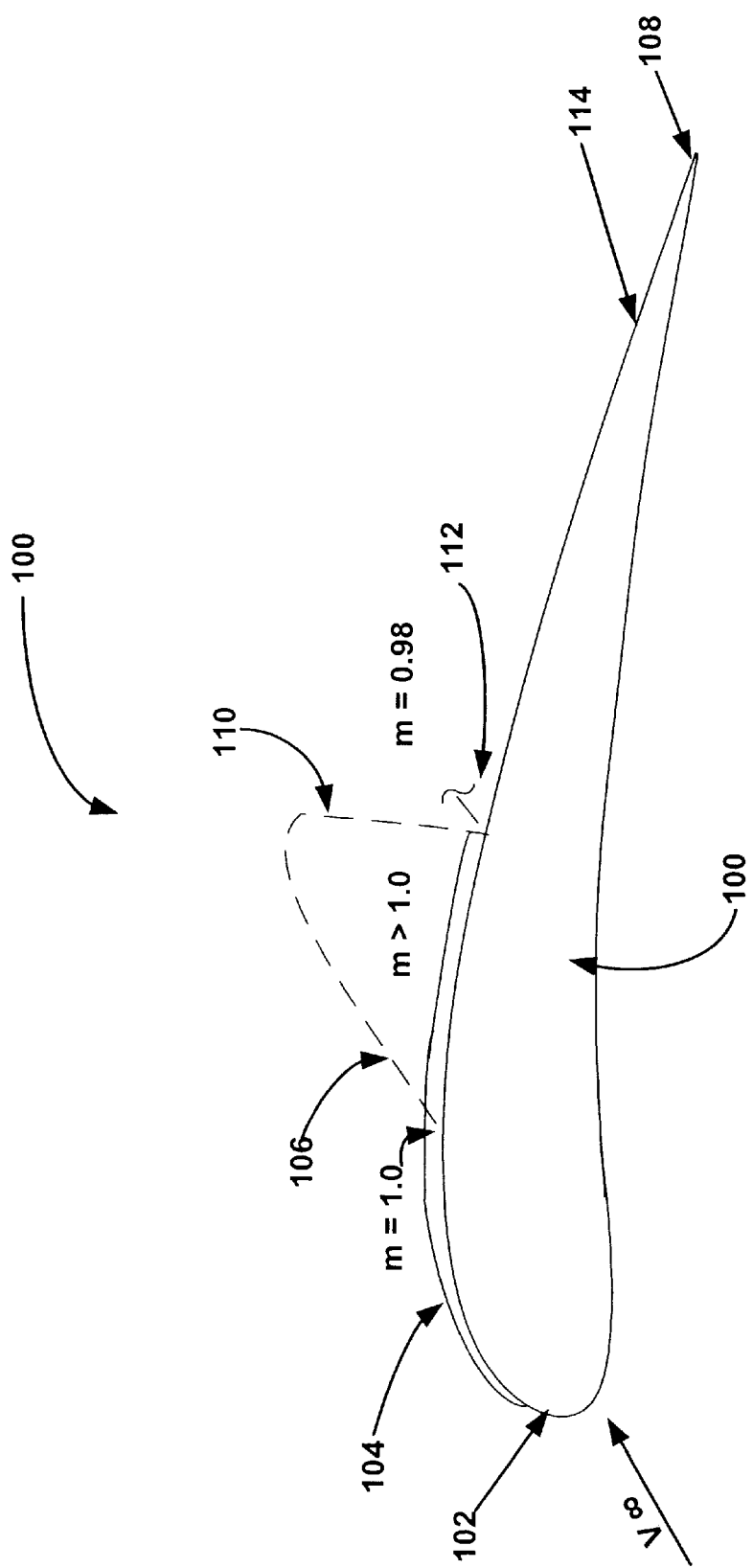
FIG. 7 shows a typical transonic airfoil having normal and pressure recovery shocks formed on an upper surface.

Referring to FIG. 7, formation of a shock on a typical transonic airfoil 100 is shown. The airflow free stream velocity $V_\infty$. interacts with the airfoil at angle of attack α. Airflow over the upper surface of the wing accelerates according to the well-known laws of conservation of mass, energy, and momentum relationships. As the air flows over the upper surface 102, a boundary layer 104 forms and flow continues to accelerate.

As the fluid velocity increases with respect to the airfoil, a local sonic bubble 106 forms where by the Mach number inside the bubble is greater then 1.0. As the flow continues to travel towards the trailing edge 108 of the airfoil, the laws of aerodynamics require that the velocity of the airstream return to subsonic levels, M<1.0. The transition back to M<1.0 causes a physical discontinuity evidenced by a shock 110, defined in the literature as the "Recovery Shock." The point where the recovery shock attaches itself to the upper surface of the airfoil is called the "Lambda foot of the shock" 112.

Figure 8:
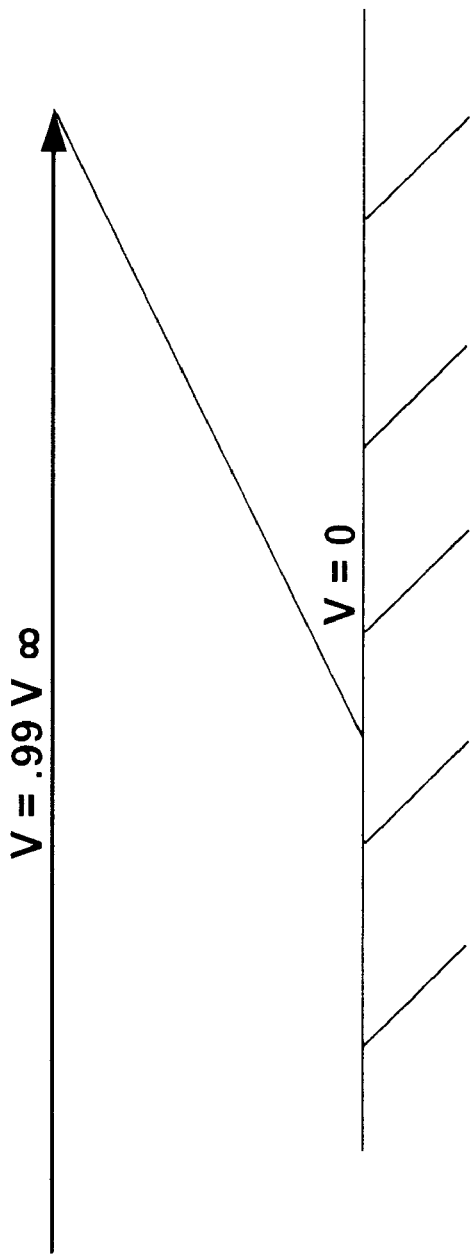
FIG. 8 shows an elevation view of a typical boundary layer formed between the free stream velocity and a surface.

Referring to FIG. 8, it can be appreciated that the boundary layer describes the region of fluid flow between the surface of the airfoil and a height above the surface where the velocity within the boundary layer equals less than, for example 99%, of the free stream velocity $V_{28}$. As is well known in the art, the viscous fluid effects describe the flow characteristics within the boundary layer. Importantly, the average velocity of fluid within the boundary layer is less than the velocity over the airfoil. Furthermore, as the fluid flows over the airfoil the height of the boundary grows, as energy is lost due to friction.

Referring again to FIG. 7, the airfoil 100 is shown with transonic flow behind the recovery shock 110. The total pressure behind the recovery shock is lower than within the bounded region, which results in a higher static pressure. Under certain conditions the higher static pressure produces a reversal of fluid flow behind the recovery shock. The flow reversal is termed "Shock Induced Separation." Down stream of the recovery shock, the shock induced separation results in a loss of lift on the upper surface 114 of the airfoil along with increased drag. It follows that, during flight it is extremely important to prevent aerodynamic forces, which cause the lambda foot 112 of the shock to rapidly migrate forward on the upper surface such as forces caused by disturbances to the boundary layer.

Referring again to FIG. 1, under certain flight conditions the snag causes a leading edge flap (LEF) separation to occur on the LEF just inboard of the snag. The LEF separation interacts with ("trips") the boundary layer and causes the boundary layer to grow substantially until the boundary layer impacts the lambda part of the recovery shock. This interaction allows the shock-induced separation to abruptly advance forward towards the leading edge thereby causing the wing to stall, thereby resulting in wing-drop. The separation of the boundary layer often occurs first on one wing due to non-uniform flow conditions on the wing pair at the onset. In particular, during certain maneuvers the aircraft angle of attack α increases which separates the boundary layer on the leading edge flap and results in wing-drop. The stabilizer, when installed as described hereinbefore attenuates and often eliminates leading edge flap separation caused by a locally, highly accelerated flow which trips the boundary layer causing a down stream influence on the recovery shock.

Figure 9:
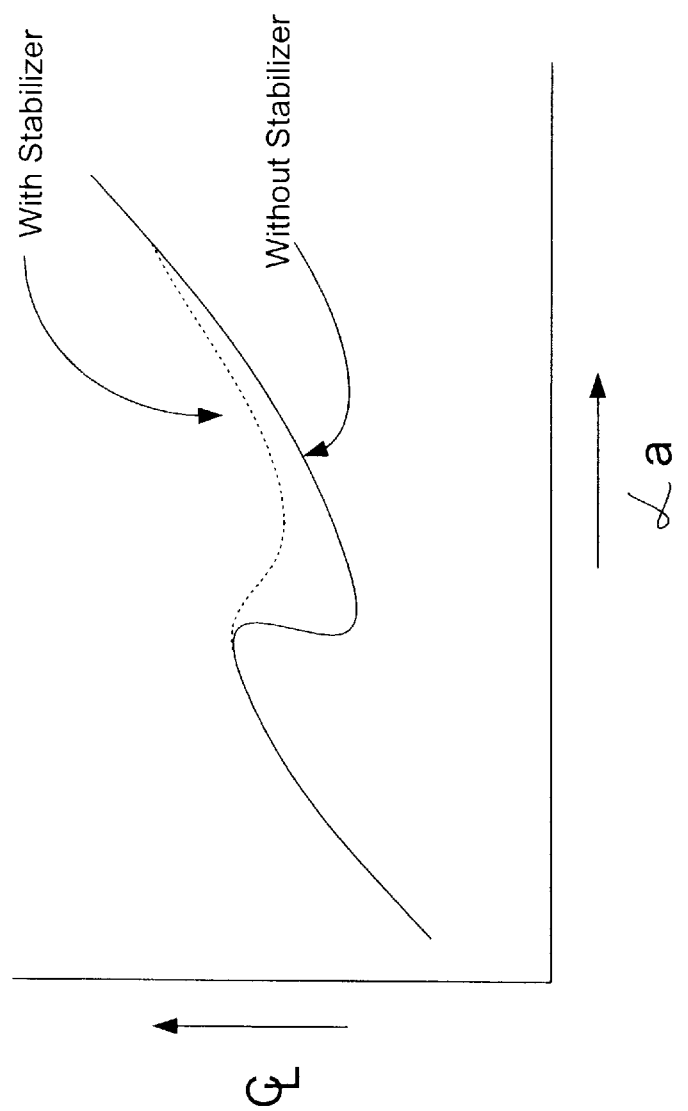
FIG. 9 shows a typical graph of lift coefficient, $C_L$, versus angle of attack a, for an aircraft including an embodiment of stabilizer compared to the same aircraft without the stabilizer.

Referring to FIG. 9, a plot of the coefficient of lift $C_L$ as a function of angle of attack α is shown. As the angle of attack a increases, $C_L$ increases until the boundary layer separates. The solid line illustrates the behavior of $C_L$ without the installation of the stabilizer while the phantom line illustrates the behavior of $C_L$ with the stabilizer installed. The effects that result in a decrease in $C_L$ a re substantially mitigated with the stabilizer installed.

Tests of a model of the F/A-18E were performed with and without the stabilizer installed as described hereinbefore were conducted using computational fluid dynamic modeling with further tests performed in wind tunnels at the NASA Langley 16 ft. transonic tunnel. During the tests leading edge flaps were extended at 10 degrees, trailing edge flaps were extended and 10 degrees, and ailerons were extended to 5 degrees. In addition, flight tests of the F/A-18E were performed which validated the benefits of the stabilizer.

The stabilizer is applicable to a multitude of aircraft and other fluid dynamic bodies, including those designed to perform at a Mach number in the range of about 0.8 or greater. The principles of the embodiment of the present invention are also applicable to flow interference regions. It is contemplated that fluid dynamic bodies, for example bodies moving through fluid mediums such as gas, liquid or plasma could develop boundary layers that interact with shocks or other substructures on the body and the stabilizer would modify the fluid effects on the boundary layer.

The previously described versions of the present invention have many advantages including but not limited to the following. By using the stabilizer, reduction or elimination of abrupt wing-stall phenomenon is accomplished by transforming the boundary layer at the leading edge. In addition, by having the forward sweep angle of the stabilizer approximately equal to the sweep back angle of the opposite wing, radar signature is reduced or minimized. Furthermore, by forming a continuous surface extending the leading edge the reduction in lift and increase in drag are minimized. Finally, aircraft vibrations are significantly reduced.

From the foregoing description of the preferred embodiment the invention has been presented for the purposes of illustration and description. It is not intended to be exhaustive or to limit the version of the invention to the precise form disclosed. Many modifications, variations and applications are possible in light of the above teaching. It is intended that the scope of the embodiment of the invention be limited not by this detailed description, but rather by the claims appended hereto.

Any element in a claim that does not explicitly state "means for" performing a specified function, or "step for" performing a specific function, is not to be interpreted as a "means" or "step" clause as specified in 35 U.S.C. 112 paragraph 6. In particular, the use of "step of" in the claims herein is not intended to invoke the provisions of 35 U.S.C. 112 paragraph 6.

What is claimed is:

1. A stabilizer suitable for attachment to the leading edge of a reaction body, the stabilizer suitable for stabilizing a shock formed during transonic velocity, the stabilizer comprising:
   a. an inboard end;
   b. an outboard end defining a local airfoil, the outboard end positioned opposite the inboard end;
   c. an upper surface extending between the inboard end and the outboard end;
   d. a lower surface extending between the inboard end and the outboard end, the lower surface opposing the upper surface;
   e. a leading edge forming a stabilizer nose, the leading edge disposed between the upper surface and the lower surface;

f. a trailing edge opposing the leading edge, the trailing edge forming a generally concave surface for facilitating attachment to the leading edge of the reaction body;

g. the outboard end of the stabilizer forming a predetermined angle omega with the trailing edge of the stabilizer for positioning the outboard end of the stabilizer; and h. the outboard end of the stabilizer forming a predetermined angle tau with the leading edge for providing a forward sweep angle.

2. The stabilizer according to claim 1 wherein the angle omega is between 10 degrees and 65 degrees for positioning the outboard end of the stabilizer.

3. The stabilizer according to claim 1 wherein the angle tau is between 10 degrees and 65 degrees for providing a forward sweep.

4. The stabilizer according to claim 1 wherein forward sweep angle is between about 20 degrees and 50 degrees.

5. A vehicle suitable for traveling through a fluid during transonic velocity, the vehicle comprising:
   a. a main body;
   b. at least one reaction body comprising:
      1. a reaction body leading edge;
      2. a snag extending from the reaction body leading edge; and
      3. the reaction body being attached to the main body for producing a reaction force;
   c. at least one stabilizer, the stabilizer suitable for stabilizing a shock formed at transonic speeds, the stabilizer comprising:
      1. an inboard end;
      2. an outboard end defining a local airfoil, the outboard end being positioned opposite the inboard end;
      3. an upper surface extending between the inboard end and the outboard end;
      4. a lower surface extending between the inboard end and the outboard end, the lower surface opposing the upper surface;
      5. a stabilizer leading edge forming a stabilizer nose disposed between the upper surface and the lower surface;
      6. a trailing edge, the trailing edge opposing the leading edge;
      7. the outboard end of the stabilizer forming a predetermined angle omega with the trailing edge of the stabilizer for positioning the outboard end of the stabilizer;
      8. the outboard end of the stabilizer forming a predetermined angle tau with the leading edge for providing a forward sweep angle; and
   d. the trailing edge of each stabilizer being attached to at least one reaction body leading edge inboard of the snag.

6. The vehicle according to claim 5 wherein the trailing edge of the stabilizer defines a concave surface for facilitating attachment to the reaction body leading edge.

7. The vehicle according to claim 6 wherein the stabilizer is attached to the reaction body using rivets, screws, welds or bonding.

8. The vehicle according to claim 5 wherein the stabilizer is formed integrally with the reaction body.

9. The vehicle according to claim 5 wherein the vehicle is an airplane.

10. The vehicle according to claim 9 wherein the main body is a fuselage and at least one reaction body is a wing.

11. The vehicle according to claim 10 wherein the wing is sweptback.

12. The vehicle according to claim 9 wherein the main body is a fuselage, the vehicle comprises two reaction bodies, each reaction body being a wing, each wing being positioned on opposite sides of the fuselage for providing lift each of the wings being sweptback.

13. The vehicle according to claim 12, wherein the predetermined angle tau is selected to provide a forward sweep angle generally equal to the magnitude of the sweep back angle of the other wing.

14. The vehicle according to claim 5 wherein the vehicle is an airplane, the main body is a fuselage and the reaction body is a tail.

15. The vehicle according to claim 5 wherein the vehicle is an airplane, the main body is a fuselage and the reaction body is a leading edge flap.

16. The vehicle according to claim 5 wherein the vehicle is a rocket.

17. The vehicle according to claim 5 wherein the vehicle is a ship and the reaction body is a sailplane.

18. The vehicle according to claim 5 wherein the vehicle is a airplane and the reaction body is a propeller.

19. The vehicle according to claim 5 wherein the vehicle is a ship and the reaction body is a propeller.

20. A airplane suitable for traveling through the air at transonic velocity, the airplane comprising:
   a. a fuselage;
   b. a pair of wings, each wing having a wing leading edge, each wing comprising:
      1. an inboard leading edge flap positioned forward of the wing leading edge;
      2. an outboard leading edge flap positioned forward of the wing leading edge, the outboard leading edge flap positioned outboard of the inboard leading edge flap; and
      3. a snag extending from the outboard leading edge flap;
   c. a pair of stabilizers, each stabilizer suitable for stabilizing a shock formed at transonic speeds, each stabilizer comprising:
      1. an inboard end;
      2. an outboard end defining a local airfoil, the outboard end being positioned opposite the inboard end;
      3. an upper surface extending between the inboard end and the outboard end;
      4. a lower surface extending between the inboard end and the outboard end, the lower surface opposing the upper surface;
      5. a stabilizer leading edge forming a stabilizer nose disposed between the upper surface and the lower surface;
      6. a trailing edge, the trailing edge opposing the leading edge;
      7. the outboard end of the stabilizer forming a predetermined angle omega with the trailing edge of the stabilizer for positioning the outboard end of the stabilizer;
      8. the outboard end of the stabilizer forming a predetermined angle tau with the leading edge for providing a forward sweep angle; and
   d. the trailing edge of each stabilizer being attached to each wing leading edge inboard of the snag.

* * * * *